June 20, 1933. J. R. FARBRIDGE 1,914,415
STOVE OR AIR HEATING APPARATUS
Filed June 19, 1930 7 Sheets-Sheet 1

June 20, 1933. J. R. FARBRIDGE 1,914,415
STOVE OR AIR HEATING APPARATUS
Filed June 19, 1930 7 Sheets-Sheet 3

Patented June 20, 1933

1,914,415

UNITED STATES PATENT OFFICE

JOHN ROBERT FARBRIDGE, OF BENSHAM, GATESHEAD-ON-TYNE, ENGLAND

STOVE OR AIR HEATING APPARATUS

Application filed June 19, 1930, Serial No. 462,324, and in Great Britain June 19, 1929.

I have applied for patents in Great Britain under No. 18,852, bearing date June 19, 1929, and in British India No. 16,973 and filed on May 5, 1930.

This invention relates to stoves or apparatus for heating air of the kind in which hot products of combustion from a fireplace or furnace are caused to travel over the exterior surface of the air heating tubes, flues, conduits or the like whereby heat is imparted to the air passing through such tubes or the like.

An object of this invention is to provide improved apparatus of the above kind so that it is possible to obtain a higher ratio of economy in regard to the quantity of fuel consumed in the apparatus relatively to the amount of heat imparted to the air passing through the apparatus.

A further object of the invention is to provide for the free expansion and contraction of the component parts of the apparatus exposed to excessive heat of the furnace gases in order to enhance the durability of the apparatus.

According to the present invention the furnace gases or hot combustion products are caused to travel over the exterior surface of air heating tubes, flues, conduits or the like (or conversely the heating medium may pass through the latter and the air to be heated pass over the exterior of such tubes) which are preferably arranged vertical or they may be inclined or horizontal, the arrangement of the tubes or the like being such that they form a series of flues or passages through which the air or the products of combustion from the furnace or fireplace travel.

Another feature of the invention consists in combining a plurality of tubes or conduits so as to form a multi-tubular element and arranging a plurality of such elements in an air heating chamber so that adjacent tubular elements form flues or passages for the air to be heated or for the furnace gases or combustion products.

A still further feature of the invention consists in the provision of upper and lower tube plates for securing and supporting tubes in position in the said chamber, the upper plate being preferably built up in sections and adapted to permit of independent expansion and contraction of the tubes while ensuring that a smoke tight joint between such tubes and the outside of the chamber is maintained.

Further features of the invention will be apparent from the following description.

In the accompanying drawings:—

Figure 1 is a front elevation of one form of apparatus.

Figure 2 is a plan view, the left half being a section on the line $a$—$a$ of Figure 3 and the right half being a plan view on the line $b$—$b$ of Figure 3, the air duct cover being removed.

Figures 5 to 15 illustrate details.

Figure 5 being a plan view of the air heating tubes, the upper and lower halves showing the arrangement of the tubes at the bottom and top respectively.

Figure 6 a front elevation of an air heating element the left half being a section on the line $e$—$e$ of Figure 5, Figure 7 a side elevation of an air heating chamber, the right half being a section on the line $f$—$f$ in Figure 5, Figure 8 a side elevation showing a preferred form of support for the furnace firebrick walls and the lower tube plate, Figure 9 a sectional elevation on the line $g$—$g$ of Figure 8, Figure 10 a sectional plan view on the line $h$—$h$ of Figure 9, Figure 11 a front elevation of one form of baffle or guard plates, Figure 12 a sectional elevation on the line $i$—$i$ of Figure 11, Figure 13 a sectional plan view on the line $j$—$j$ of Figure 12, Figure 14 a side elevation of one form of fire brick, and Figure 15 a plan view of Figure 14.

In carrying the invention into effect in accordance with one embodiment of the invention and as illustrated in Figures 1 to 4 (while Figures 5 to 25 may also be referred to as indicating separate elements of my improved apparatus, a stove is provided having a central fireplace 1 and air heating chambers 2 disposed on each side thereof through which the furnace gases are caused to pass. The vertical walls of this chamber may be constructed of bricks 3 and metal plates 4 and the inside walls thereof may be formed by the vertical walls of the central fireplace. The horizontal top and bottom sides of the chambers are formed by metal plates 5, 6 which are adapted to accommodate and support the air tubes 7. The construction and arrangement of these plates 5, 6 from an important feature of the present invention and will be described hereinafter.

The firebricks 3 forming the walls of the fire chamber and also the inside walls of the air heating chambers may be built up on members 8 which are preferably formed of cast iron but may be of other suitable material. These members 8 are clearly shown in Figures 8, 9, 10 also in Figures 19, 20, 21 in which a modified form of member is illustrated, such latter form being designed for use with the square form of tubes illustrated in Figures 16–18.

Figure 3:
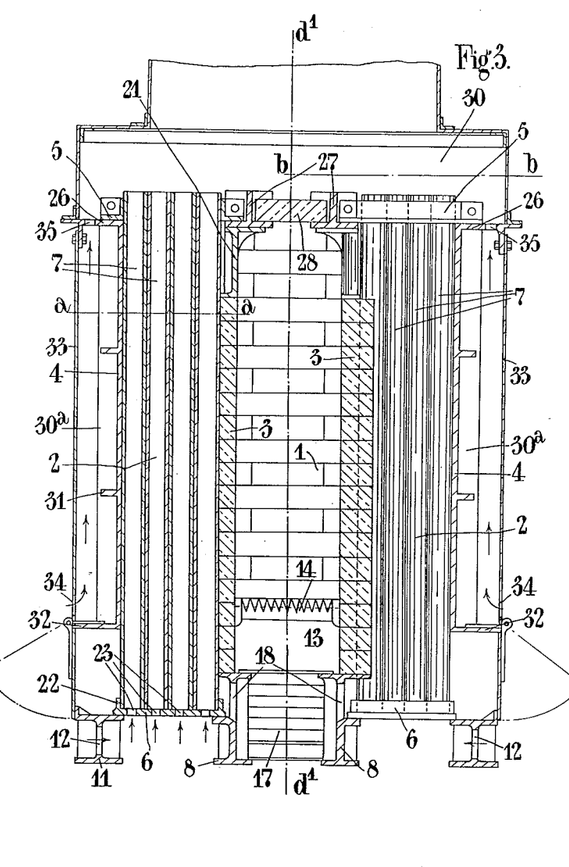
Figure 3 is a sectional elevation, the left half being a section on the line $c$—$c$ of Figure 4 and the right half being a section on the line $d$—$d$ of Figure 4.
Figure 4:
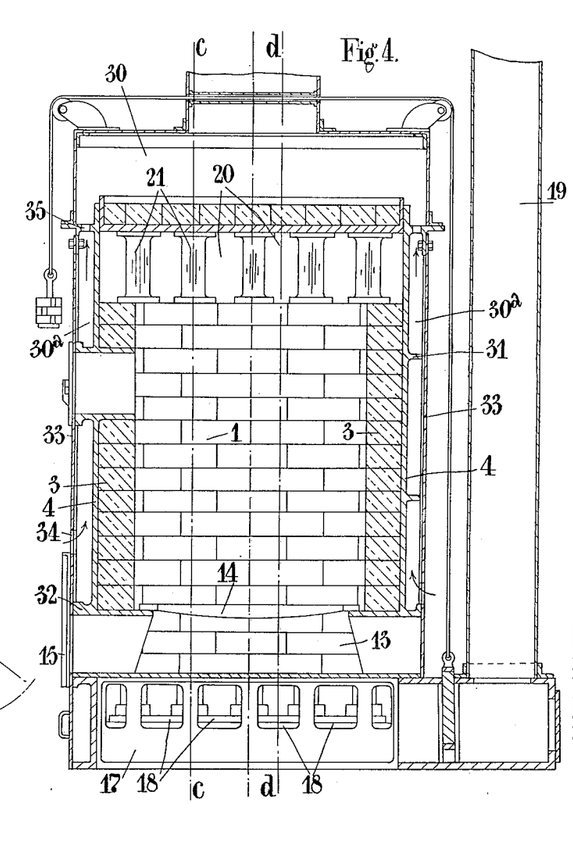
Figure 4 is a sectional elevation taken on the line $d'$—$d'$ of Figure 3.

As is clearly shown in Figures 8, 9, 10 and 19, 20, 21 the members 8 are formed with upper supporting surfaces 9 upon which the firebricks 3 are built up and with additional supporting surfaces 10 which serve to support the lower tube place 6 at their inner ends while members 11 may also be provided and adapted to support the lower tube plates at their outer ends (Figure 3).

The members 11 are preferably formed with openings or apertures 12 (which may comprise a single aperture on each member or a plurality of apertures) in order to permit of the free passage of air from the outer sides of the apparatus to the air tubes. The direction of flow of the air into the tubes is indicated by arrows in Figure 3.

In Figures 1 to 4, which illustrate apparatus for burning solid fuel, I also provide an ashpit 13 below the firebars 14 and an ashpit cover 15 for regulating the admission of air to the fire.

The air tubes 7 are arranged in rows in the said chambers 2 extending from each side of the fireplace to the outer walls of each chamber and adjacent rows of tubes are adapted to form flues or passages 16 (Figures 2, 5, 7, 16, 18) for the furnace gases or combustion products. A main smoke flue 17 is provided at the bottom of the stove or heating apparatus communicating with the smoke flues 16 of the heating chambers through ports 18 (Figures 3, 4, 8 to 10 and 19 to 21) and with a smoke chimney 19 which is preferably located at the rear of the apparatus. This main flue is preferably located beneath the central firegrate and may be common to the flues of both the air heating chambers.

Suitable openings or ports 20 (Figure 4) are provided near the top of the walls of the furnace or fireplace which communicate with flues or passages 16 formed in the heating chambers by the rows of air heating tubes and as previously stated suitable openings or ports 18 are also provided at the bottom of the heating chambers which provide communication between the said flues and the main smoke flue or flues so that in effect each flue is provided with an inlet and outlet port for the furnace gases. The arrangement is such that the furnace gases enter the heating chambers at the top and after traversing the exterior surfaces of the rows of air heating tubes leave the heating chambers through the ports 18 at the bottom thereof and are led away through the main smoke flue or flues 17 to the smoke chimney 19.

Figures 1, 2, 11, 12, 13, 14, 15:
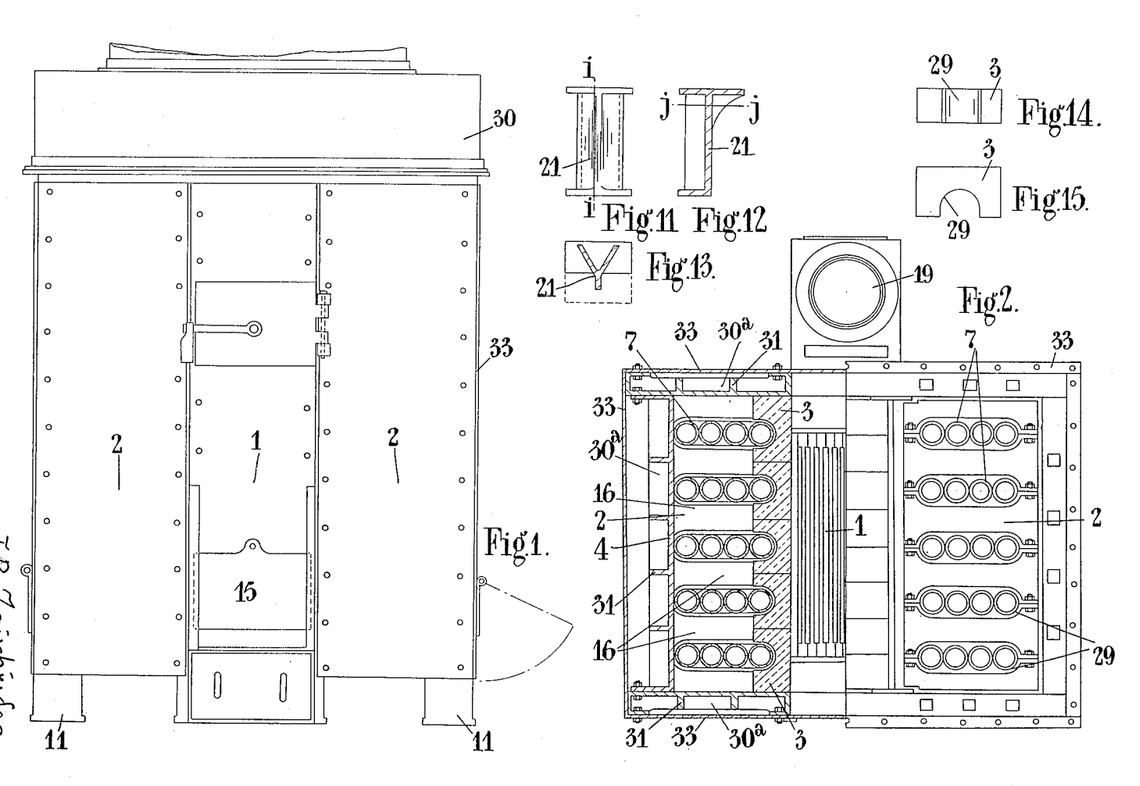

In order to prevent the hot combustion products or furnace gases from impinging directly on to the tubes nearest the fireplace as they enter the upper ports 18 baffle or guard plates 21 are provided at this point which are adapted to deflect the gases into the flues or passages in the heating chamber. These plates are preferably formed to cover the forepart of the first tubes of each row and as illustrated in Figures 11, 12, 13, they may conveniently be of spear head or V shape and are secured in position in any suitable manner, provision being made to permit of expansion and contraction thereof. Alternatively such baffles or guards may be formed by extensions of the firebricks 3.

The air heating chambers 2 are located above the floor level of the heating apparatus, as is clearly illustrated in Figure 3, sufficient space being left between the bottom of the heating chambers and the floor to allow for a free flow of air through the tubes in said chambers, the tubes 7 being open at the top and bottom as shown.

In this connection it will be apparent that as the air to be heated flows upwardly through the tubes its expansion as it becomes heated by contact with their interior surfaces will produce a current of air up through them without the aid of any mechanical acceleration such as a blower or fan although same may be employed in order to force or draw the air through the tubes if and when required.

Referring to the arrangement of the air heating tubes in the heating chambers as previously described same are arranged in rows and are preferably vertical or they may be inclined or horizontal and are open at both ends so that the air may flow freely therethrough from the space beneath to any desired point.

It is not essential that the air heating flues should be formed in the manner illustrated in the drawings and if desired such flues may be formed by rows of tubes having the tubes of each row arranged in spaced relation and connected together or having the spaces between them closed by plates or baffles.

Alternatively, the flues may be formed by a series of vertical inclined or horizontal plates or baffles suitably arranged in the air heating chambers so that chambers or flues are formed between adjacent plates through which the air to be heated and the furnace gases or combustion products are caused to pass, the air to be heated being arranged to flow through alternate chambers or flues while the furnace gases or combustion products flow through the intermediate chambers or flues so formed.

Such plates or rows of tubes may be formed into circular, oval, rectangular or any other suitable or desired shape according to any particular shape or form of channels or flues it may be desired or required to provide, it being understood that the upper and lower plates for supporting the tubes or plates will be correspondingly modified in order to suit any particular arrangement of the tubes or plates. Furthermore, while the air heating flues have been shown as arranged at right angles to the central heating chamber it is to be understood that I may find it convenient to otherwise arrange these flues, e. g., they may be arranged in rows parallel with the central heat chamber or fireplace.

The upper and lower horizontal sides of the heating chamber are preferably formed by metal plates 5, 6 which are arranged to support the tubes in position. The lower plate 6, which may be of cast iron, may be formed in one piece and provided with upstanding flanges 22 forming closed elongated chambers in which the lower ends of the tubes are adapted to be secured. These elongated chambers are preferably arranged in rows extending one behind the other from front to rear and are each adapted to accommodate any desired number of tubes sufficient or any desired space being left between the chambers for the smoke flues 16 formed by the rows of tubes. The elongated chambers are preferably of such dimensions that they may accommodate any predetermined number of tubes therein in close relation and the arrangement is such that the tubes in these chambers combined with corresponding but modified supporting means at the top form rows of multi-tubular elements in the heating chambers. The bottom plate is provided with suitable orifices 23 in the said elongated chambers adapted to correspond with the tubes arranged in such chambers to permit of the free flow of air into the tubes at the bottom. The said orifices are preferably smaller in diameter than the tubes in order to provide flanged supports for the tubes in the chambers and so that the tubes rest firmly therein and around the orifices. Sufficient space is provided between the tubes and the walls of the elongated chambers to enable suitable packing material 24 (Figure 5), such as red lead, asbestos, etc., to be employed in order to make and secure a smoke tight joint between the tubes and the bottom plate.

The upper tube plate 5 is preferably made up of cast iron sections in order to facilitate the securing of the tubes in position and the forming of the multi-tubular elements and particularly in order to facilitate the renewing of any part in a multi-tubular element. The sections are suitably secured together as by bolts 25 (Figures 5, 7, 16, 18) to form the upper tube supporting plate and also the horizontal top side or roof of the heating chambers.

The sectioned top tube plate may be secured to the vertical side walls of the heating chamber in any desired manner. In the particular form of the invention, as illustrated in the drawings, the upper tube plate is supported and secured in position by forming the outer walls 4 of the heating chambers with a flange 26 at the top so as to provide for the support of the upper tube plates at their outer ends while an inverted T section iron piece 27 is provided at each of the inside walls of the heating chambers 2 for supporting the plate at that end and also the fireplace crown 28.

The sections forming the upper tube plates are preferably formed with substantially semi-circular pockets 29 (Figures 2 and 5) at each longitudinal side which are adapted to receive the upper ends of the tubes supported by the lower tube plate and the arrangement is preferably such that the pockets of adjacent section pieces co-operate to firmly secure and support the multi-tubular elements at the top. The space between the outside of the tubes and the side walls of the sectional supports is packed by any suitable material in order to provide and secure a smoke-tight joint at the point.

The upper ends of the tubes extend beyond the upper tube plate and open into a suitable chamber or chambers 30 into which the heated air is delivered.

The tubes of each multi-tubular element are so arranged and supported by the upper and lower tube plates that each tube is free to expand and contract independently of the other, it being understood, that while the tubes have been referred to as being securely supported in position by the upper and lower tube plates they are sufficiently free to allow for these movements.

When the size of the air heaters is comparatively small the tubes forming the multitubular elements may be welded or brazed together preferably at their ends before inserting and securing them in position in the upper and lower tube plates or the tubes may be cast together in the form of a header at the top and also at the bottom, if desired, and the multi-tubular elements so formed suitably screwed together.

Alternatively, the air tubes may be formed by corrugated or other suitably shaped plates, bolted or otherwise secured together the arrangement being such that the plates can be combined together to form passages or conduits therein for the passage of air to be heated.

Instead of forming the upper tube plate in sections as previously described I may choose to form same as a single plate or casting having provision for supporting and securing the tubes in position at the top of the heating chamber. When employing such a single upper tube plate the same may be formed with rows of holes or apertures corresponding with the tube receiving chambers on the bottom tube plate and through which holes or apertures the tubes are adapted to pass. In such a construction the tubes may be conveniently arranged in position in the heating chambers by introducing same at the top of the latter through the holes or apertures in the upper tube plate and into the tube receiving chambers in the bottom tube plate.

Figures 5, 6, 7, 9:
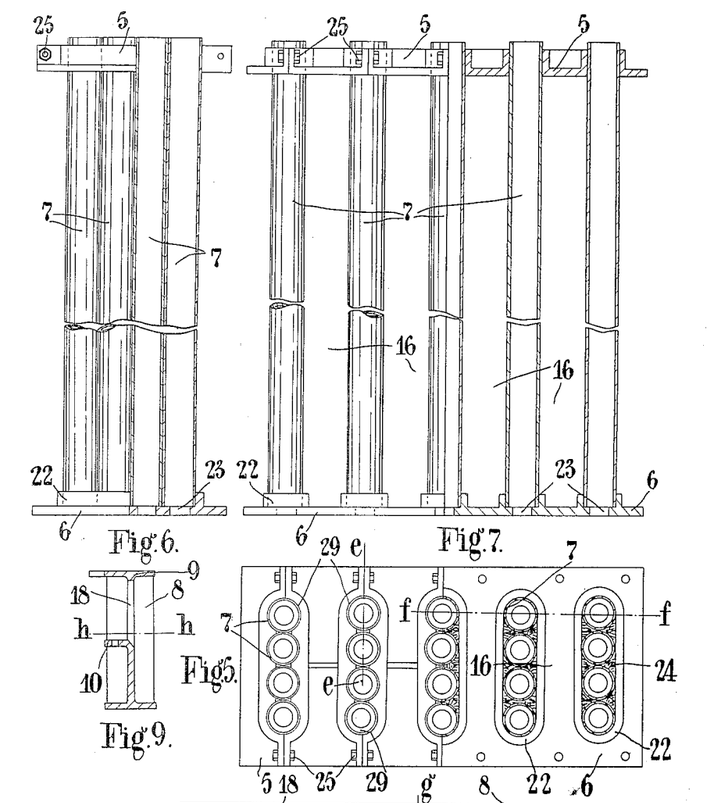
Figure 8:
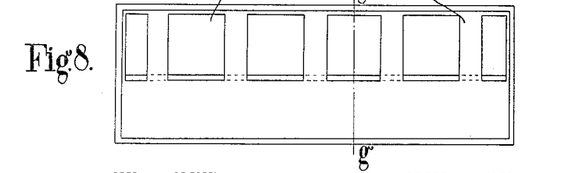
Figure 10:
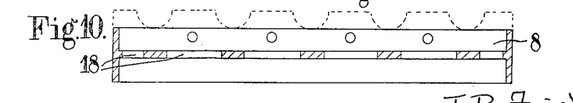

Figures 5, 6 and 7 illustrate one form of my tubular elements in detail, the several parts referred to in connection with the above description being indicated by like references in these figures.

Figure 16:
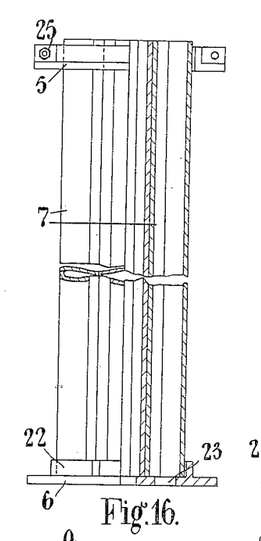
Figures 16 to 25 are similar views to Figures 6 to 10 and 14 to 15 illustrating various modifications.
Figures 17, 18:
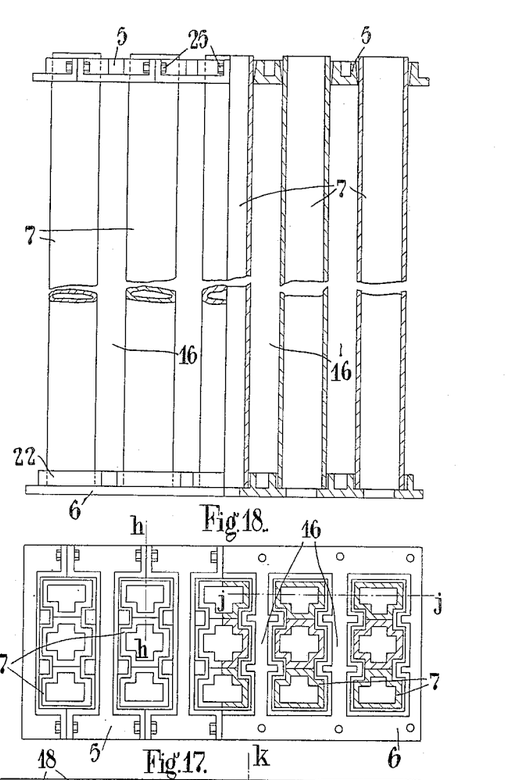
Figure 19:
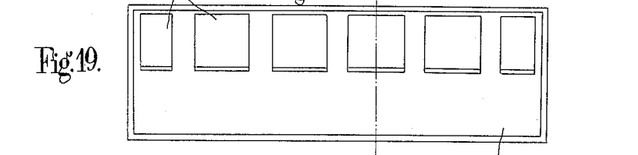
Figure 20:
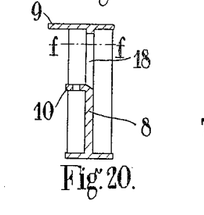
Figure 21:
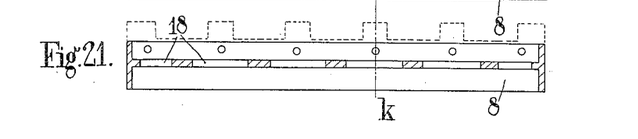
Figure 22:
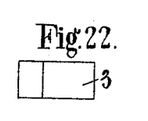
Figures 23, 25, 27:
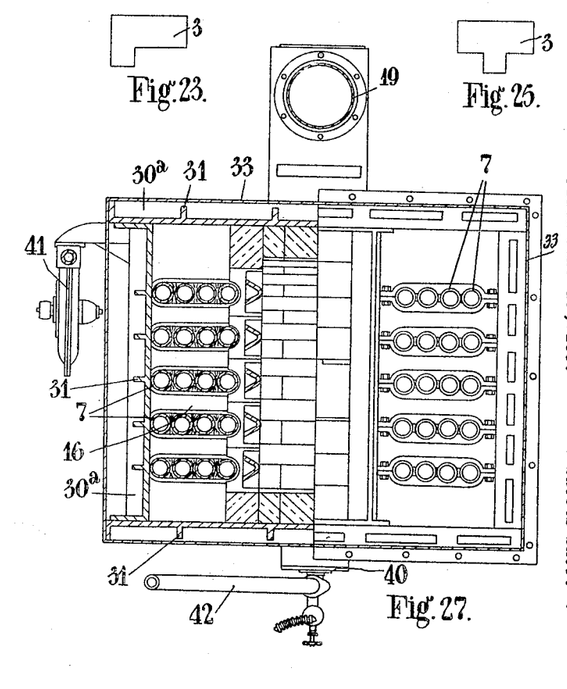
Figure 27 is a plan view of Figure 26, the left and right halves being sections on the lines *k—k* and *l—l* respectively of Figure 28.
Figure 24:
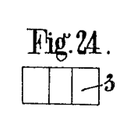
Figure 26:
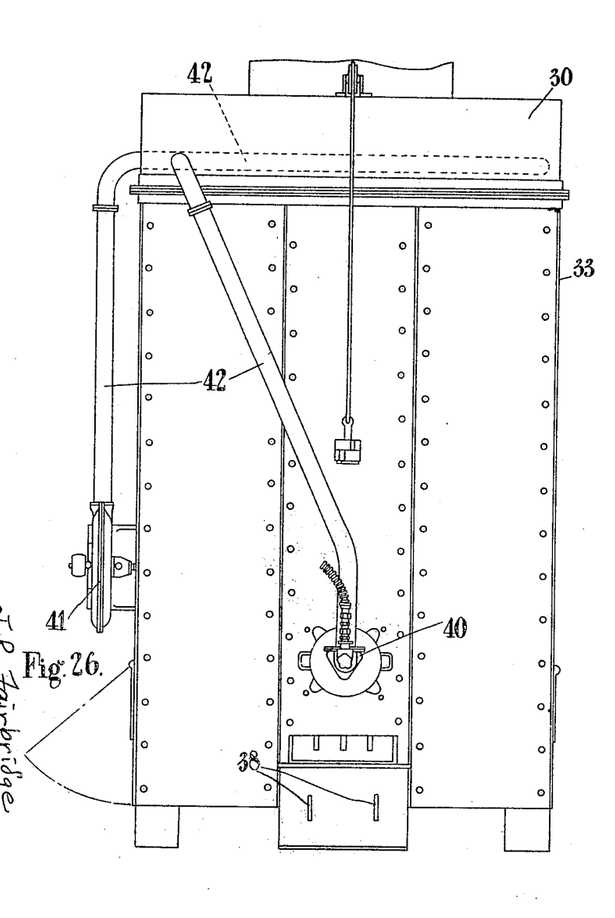
Figure 26 is a front elevation of a modified form of apparatus adapted to burn oil or pulverised fuel.
Figure 28:
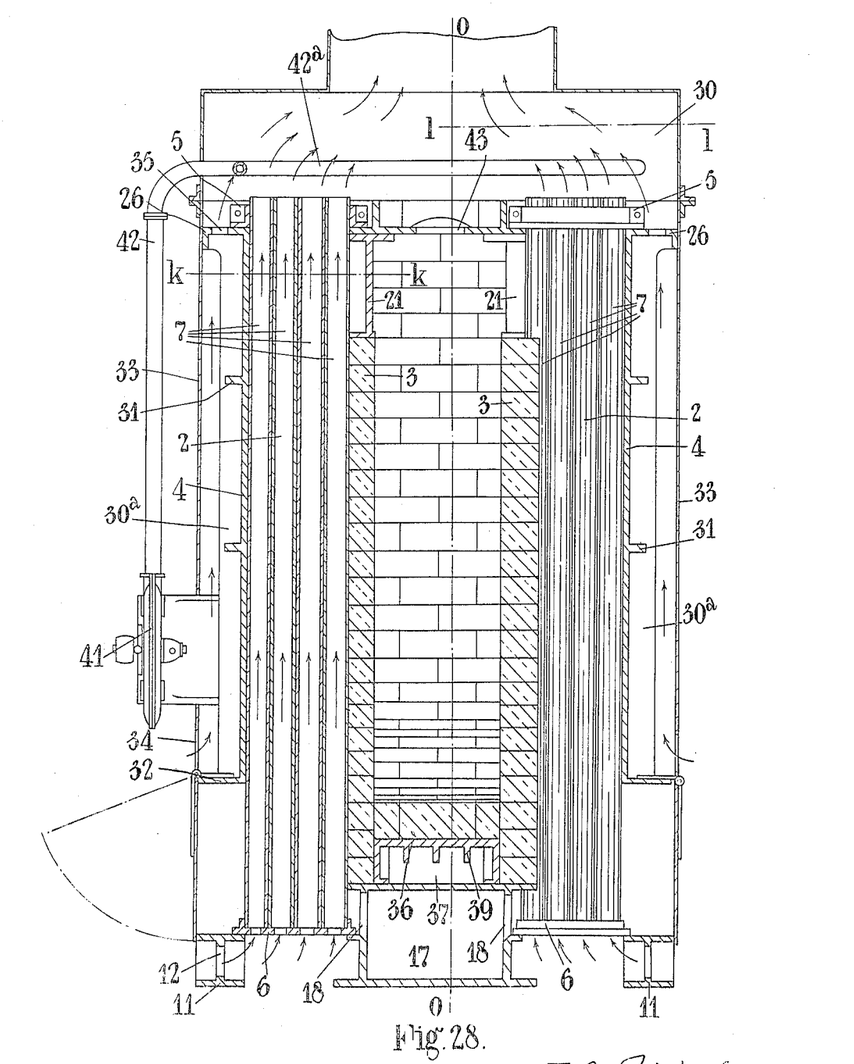
Figure 28 is a sectional front elevation of Figure 29, the left and right halves of this figure being taken on the lines *m—m* and *n—n* respectively of Figure 29.

In Figures 16, 17 and 18 there is shown another form of multi-tubular elements comprising tubes of square form. For the sake of convenience the same references have been used in these figures to indicate similar parts.

In addition to the main air heating chambers provided in accordance with this invention having rows of air tubes forming smoke flues in the heating chambers I may also provide auxiliary or additional air heating chambers 30ª formed as jackets to the said main heating chambers 2 in order to utilize the heat radiated from the sides of the said main heating chamber.

Such additional air heating chambers may be formed by providing channel section supporting members at each corner of the main air heating chamber and such sections may be adapted to support the upper tube plate and the crown roof of the fireplace. The channel girders on each side of the main heating chamber preferably have their flanged sides oppositely disposed so that by bridging the space between the pairs of channel members as by means of metal plates which form extensions of the oppositely disposed flanges of the girders a jacket or chamber is formed on the main air heating chamber. Such jackets in an oven embodying a central fireplace are preferably formed at the front and rear of the stove while similar additional air heating jackets may be formed at the outer sides of the stove so that the apparatus is jacketed on all its sides.

These additional air heating chambers are open at the bottom and are raised above the floor level in order to permit of a free flow of air through the chambers. The chambers preferably communicate at the top in any suitable manner with the hot air receiving chamber which receives the heated air from the tubes of the main heating chamber or chambers.

In the particular arrangement illustrated in the drawings these auxiliary or secondary air heating chambers are formed by the outer metal plates 4 which are preferably formed or provided with ribs or gills 31 on their outer sides in order to provide increased air heating surfaces. The flanges 26 at the top of these plates and flanges 32 provided at the bottom thereof are formed to receive plates 33 which, as shown, may be bolted to the said plates, leaving a space between the plates forming the said chambers 30ª, inlet ports 34 and outlet ports 35 being provided for the passage of the air into the auxiliary or secondary air heating chambers so formed and the delivery of the heated air into the main hot air chamber 30.

I prefer to provide suitable control means, such as flap tubes or shutters, at the inlets to the said additional air heating chambers in order that the supply of air thereto may be regulated as required in order to meet any particular working or other conditions.

In the application of my invention for use with apparatus adapted to utilize oil or pulverized fuel and, as illustrated in Figures 26 to 29 of the drawings, in the place occupied by the fireplace in the other form of my invention I insert a casting 36 which forms an air heating passage 37 below the bottom of the furnace, the arrangement being such that air may enter the said passage from the front at 38 and pass up the back of the oven in the direction shown by the arrows (Figure 29) the heated air being delivered into the hot air chamber 30. The casting 36 is preferably formed with ribs or gills 39 thereon in order to provide an increased heat radiating surface.

The arrangement of the air heating tubes smoke flues and other parts of the apparatus with, of course the exception of the oil or other burning apparatus is the same in these figures as in the previously described figures and the same references have been used in Figures 26 to 29 to indicate similar parts.

The oil fuel or other burner is shown at 40 and a blower or fan 41 is provided for propelling the air through the pipe 42 and gives a constant supply to the oil burner 40. A portion 42ª of the said pipe is as shown passing through the hot air chamber 30 and the air supply to the oil burner is therefore preheated.

Figure 29:
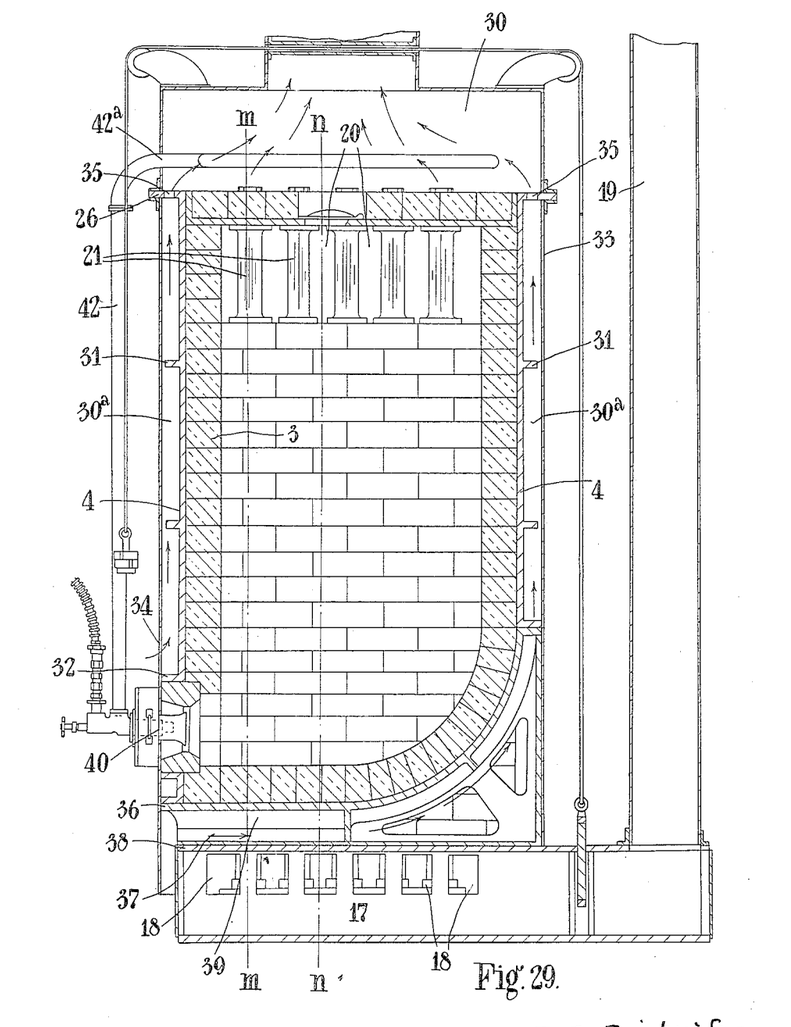
Figure 29 is a sectional side view taken on the line *o—o* of Figure 28.

The curved arrangement of the rear wall of the furnace as illustrated in Figure 29, results in a swirling motion being given to the gases and assists in the atomization and completion of combustion.

I may also provide a safety valve 43 at the crown of the furnace which valve is adapted to open in order to permit of the escape of the gases in the event of an explosion occurring due to accumulated gases.

It is to be understood that the foregoing details of construction are given purely by way of example to illustrate the nature of the invention which consists broadly in the provision of a series of multi-tubular elements in an air heating chamber forming flues for the passage of hot furnace gases or combustion products (or for the air to be heated) over the exterior surfaces of such tubes through which air (or the heating medium) flows with provision for independent expansion and contraction of such tubes and I may modify the form and arrangement of the air heating apparatus in accordance with the conditions or any practical requirements that may have to be fulfilled.

Thus although in the specific forms of my improved oven illustrated and described herein the air is shown as being arranged to pass through the tubes while the combustion products or furnace gases pass through the flues formed by adjacent tubular elements it will be understood that this arrangement may be reversed and the air passed through the flues 16 and the gases through the tubes 7.

Such an arrangement could be provided for in the forms of apparatus illustrated, without any material reconstruction thereof.

For example the lower ends of the tubes 7 may be connected to a suitable header or like chamber or conduit communicating with the central smoke flue 17 the furnace gases being caused to enter the tubes at the top and flow through the tubes after which they would be led away to the said central smoke flue, while the flues 16 would be open at the bottom so as to permit of the free passage of air through such flues which air would become heated by contact with the exterior surfaces of the tubes.

A suitable cover could be provided over the top of the tubes 7 which would isolate them from the hot air receiving chamber 30 and provide a conduit or chamber through which the furnace gases or combustion products can flow from the central fireplace or combustion chamber to the said tubes (the fireplace crown 28 being removed or omitted for this purpose) while suitable conduits or passages could be provided leading from the said flues 16 to the hot air receiving chamber so formed so that the heated air may flow into such chamber.

Having now particularly described and ascertained the nature of my said invention and in what manner the same is to be performed, I declare that what I claim is:—

1. Air heating apparatus comprising in combination a furnace, a heating chamber which receives the hot combustion products from the furnace and a plurality of banks of tubes arranged in said heating chamber with the end tubes of each bank in close proximity to the adjacent walls of the heating chamber and with the tubes in each bank in close contact with each other so that isolated flues are formed between the adjacent banks of tubes, said tubes and flues serving for the passage of the air and furnace gases.

2. Air heating apparatus comprising in combination a furnace, a heating chamber in communication with said furnace at its upper end, a plurality of banks of tubes arranged in said heating chamber with the end tubes of each bank in close proximity to the adjacent walls of the heating chamber and with the tubes in each bank in close contact with each other so that isolated flues are formed between the adjacent bank of tubes, means for supporting said tubes in position within the heating chamber such that independent expansion and contraction of the tubes is permitted, said tubes and flues serving for the passage of the air and furnace gases respectively.

3. Air heating apparatus comprising in combination a combustion chamber, a heating chamber disposed on opposite sides of the combustion chamber and having communication with the latter, a plurality of banks of tubes arranged in said heating chambers with the end tubes of each bank in close proximity to the adjacent walls of the heating chamber and with the tubes in each bank in close contact with each other so that isolated flues are formed between the adjacent banks of tubes, said heating chambers having inlets at the upper end thereof for the passage of the furnace gases thereinto and having outlets at the lower ends thereof for the discharge of the furnace gases therefrom and said tubes and isolated flues serving for the passage of the air to be heated and the furnace gases respectively.

4. Air heating apparatus according to claim 3 wherein the walls of the combustion chamber which separate the latter and the air heating chambers are formed of firebrick and means are provided for supporting the said tubes in position within the heating chambers, so that independent expansion and contraction of the tubes is permitted.

5. Air heating apparatus comprising in combination a furnace, a heating chamber, a plurality of banks of tubes arranged within said heating chamber with the end tubes of each bank in close proximity to the adjacent walls of the heating chamber and with the tubes in each bank in close contact with each other so that isolated flues are formed between the adjacent banks of tubes and a firebrick partition between said heating chamber and furnace, said heating chamber having inlets and outlets to and from the said flues therein disposed near the extreme ends of the chamber so that the furnace gases traverse a substantial length of the tubes through which the air to be heated passes.

6. Air heating apparatus as claimed in claim 1, wherein the air is admitted at the bottom of the heating chamber, the floor of the latter being raised off the ground level a distance sufficient to permit a free passage of air into said chamber from below.

7. Air heating apparatus as claimed in claim 1, combined with an oil fuel burner having means associated therewith for preheating the air supplied to the burner.

8. Air heating apparatus comprising in combination a furnace having walls composed of firebrick, a heating chamber disposed outside said furnace but having communication with the latter, a plurality of banks of tubes arranged in said heating chamber with the end tubes of each bank in close proximity to the adjacent walls of the heating chamber and with the tubes in each bank in close contact with each other so that isolated flues are formed between the adjacent banks of tubes and chambers disposed at the ends of the heating chamber for the admission and reception respectively of the cold incoming and of the hot outgoing air from the said tubes, a partition between the top of the furnace and the flues formed in the heating chamber having openings therein for the admission of the separate streams of heating gases to the flues, a chamber formed below the combustion chamber and having openings therein for the passage of the furnace gases from said flues, said chamber communicating with a chimney for the discharge of the used furnace gases.

9. Air heating apparatus comprising in combination a furnace, a heating chamber, a firebrick partition separating said furnace and heating chamber for a portion of their lengths, said heating chamber having a plurality of inlets and outlets for the admission and discharge of the furnace gases to and from the heating chamber respectively, a plurality of vertically extending banks of tubes arranged in said heating chamber with the end tubes of each bank in close proximity to the adjacent walls of the heating chamber and with the tubes in each bank in close contact with each other so that a plurality of isolated flues are formed between the adjacent banks of tubes which flues in such manner serve to receive the furnace gases admitted through said inlets in the heating chamber, said tubes being open at the bottom for the admission of the air to be heated, the furnace gases and air passing through the heating chamber in counterflow direction and a chamber being provided below the furnace having communication with the flues in said heating chamber whereby the furnace gases may be removed through said chamber after the furnace gases have traversed the flues and heated the tubes for a substantial amount of their lengths.

10. Heating apparatus comprising in combination a furnace, a chamber for receiving hot gases from said furnace, said chamber having side walls and end walls, banks of tubes in said chamber arranged with the end tubes of each bank in contact with the side walls of the chamber and with the tubes of each bank in contact with each other so that isolated flues are formed between the adjacent banks of tubes, said tubes and flues being adapted so that the medium to be heated may be passed through one and the hot furnace gases through the other and one of said end walls being provided with openings through which the corresponding end portions of each bank of tubes extend and within which openings these end portions are in contact with each other, the said tubes, at their opposite ends, being seated upon the other end wall of the said chamber.

11. Heating apparatus according to claim 10, wherein the one end wall is provided with chambers and the said opposite ends of the banks of tubes are seated within said chambers and which chambers are provided with packing material whereby smoketight joints may be made at such ends of the tubes, these ends being also maintained in contact with each other within said chambers so that the tubes of each bank are maintained in contact with each other throughout their entire lengths.

12. Heating apparatus according to claim 10, wherein the openings in the first mentioned end wall for each bank of tubes are contiguous with each other and means is provided in association with these openings adapted to receive packing material by which smoketight joints may be made at the ends of the tubes which are received within the openings in this end wall.

13. Heating apparatus according to claim 10, wherein said tubes are vertically arranged and adapted for passage lengthwise through the openings provided in the first mentioned end wall.

14. Heating apparatus according to claim 10, wherein the other end wall is provided with openings which are smaller than the tube openings and communicate therewith.

In testimony whereof I have signed my name to this specification.

JOHN ROBERT FARBRIDGE.